United States Patent
Rhodes et al.

(10) Patent No.: US 6,949,043 B2
(45) Date of Patent: Sep. 27, 2005

(54) ECCENTRIC DRIVE REDUCTION GEAR FOR A TRANSMISSION COMPONENT WINDING DRUM

(75) Inventors: Chris Rhodes, Orleans (FR); Sylvain Chonavel, Thury Harcourt (FR)

(73) Assignee: ArvinMeritor Light Vehicle Systems-France, Sully-sur-Loire (FR)

(*) Notice: Subject to any disclaimer, the term of this patent is extended or adjusted under 35 U.S.C. 154(b) by 0 days.

(21) Appl. No.: 10/454,379

(22) Filed: Jun. 4, 2003

(65) Prior Publication Data

US 2004/0067814 A1 Apr. 8, 2004

(30) Foreign Application Priority Data

Jun. 4, 2002 (FR) .............................. 02 06844

(51) Int. Cl.[7] .......................... F16H 9/26; F16H 58/08; E05F 15/00; E05F 11/38
(52) U.S. Cl. .......................... 475/182; 49/139; 49/348; 475/170; 475/334
(58) Field of Search ................................ 475/182, 331, 475/169–170, 334, 349, 255, 163–165, 181, 185; 49/139, 348–350, 353, 352, 502

(56) References Cited

U.S. PATENT DOCUMENTS

| | | | | |
|---|---|---|---|---|
| 1,623,306 A | * | 4/1927 | Chilton ........................... 74/6 |
| 1,888,479 A | * | 11/1932 | Stolp ........................... 475/182 |
| 2,084,658 A | * | 6/1937 | Stolp ........................... 475/269 |
| 2,404,116 A | * | 7/1946 | Wolowicz et al. ............ 74/401 |
| 3,007,342 A | * | 11/1961 | Wardlaw ........................ 74/2 |
| 3,052,138 A | * | 9/1962 | Louton, Jr. .................. 475/176 |
| 3,077,125 A | * | 2/1963 | Louton, Jr. .................. 475/162 |
| 3,148,560 A | * | 9/1964 | Woodward, Jr. ............. 74/640 |
| 3,190,148 A | | 6/1965 | Flichy |
| 3,721,130 A | * | 3/1973 | McKee ........................... 74/86 |
| 3,948,119 A | * | 4/1976 | Schlapp ....................... 475/175 |
| 4,567,789 A | * | 2/1986 | Wilkes ........................ 475/182 |
| 4,807,494 A | | 2/1989 | Lew |
| 4,841,810 A | | 6/1989 | Lew |
| 5,360,380 A | * | 11/1994 | Nottle .......................... 475/182 |
| 5,462,363 A | * | 10/1995 | Brinkman ..................... 384/91 |
| 5,954,611 A | * | 9/1999 | Mills et al. .................. 475/182 |
| 6,018,223 A | * | 1/2000 | Oruganty et al. ............. 318/10 |
| 6,530,175 B2 | * | 3/2003 | Sato et al. .................... 49/138 |
| 6,629,905 B1 | * | 10/2003 | Sesselmann et al. ......... 475/149 |

FOREIGN PATENT DOCUMENTS

DE 199 44 915 A1 3/2001
DE 100 47 934 A1 4/2001

OTHER PUBLICATIONS

Search report, dated Feb. 20, 2003.

* cited by examiner

*Primary Examiner*—Tisha Lewis
(74) *Attorney, Agent, or Firm*—Carlson, Gaskey & Olds

(57) ABSTRACT

An eccentric reduction gear for a vehicle window winder system has a ring gear, a planet pinion that is eccentric relative to the ring gear, a drive component that drives the planet pinion and the ring gear so that they roll relative to each other, and a winding drum attached to the planet pinion. A transmission component is wound around the winding drum and drives a vehicle window. The reduction gear provides a high reduction ratio in a small space and also ensures that the movement cannot be reversed.

22 Claims, 4 Drawing Sheets

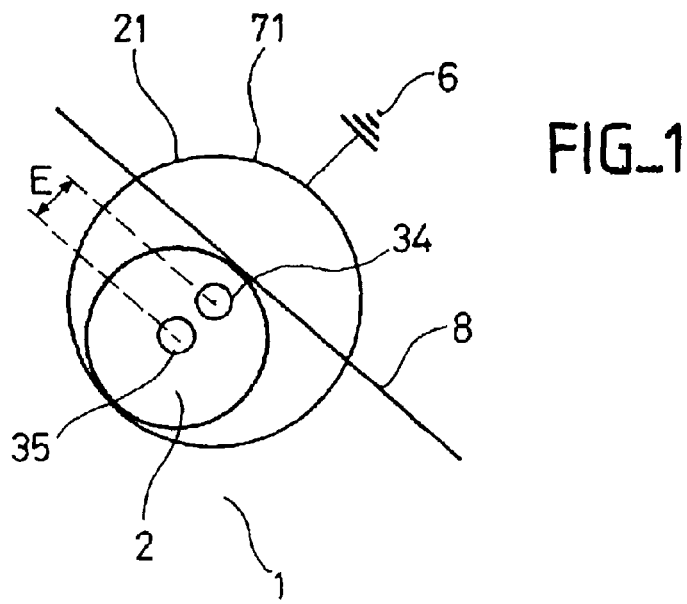
FIG_1
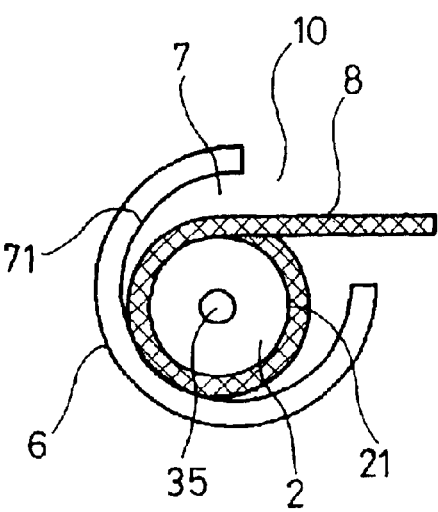
FIG_2
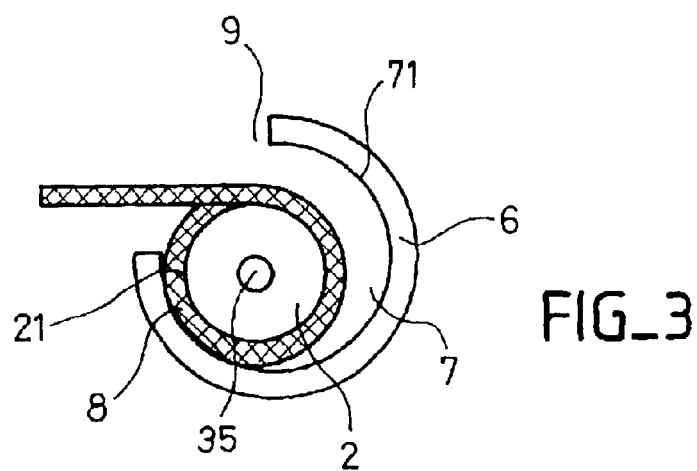
FIG_3

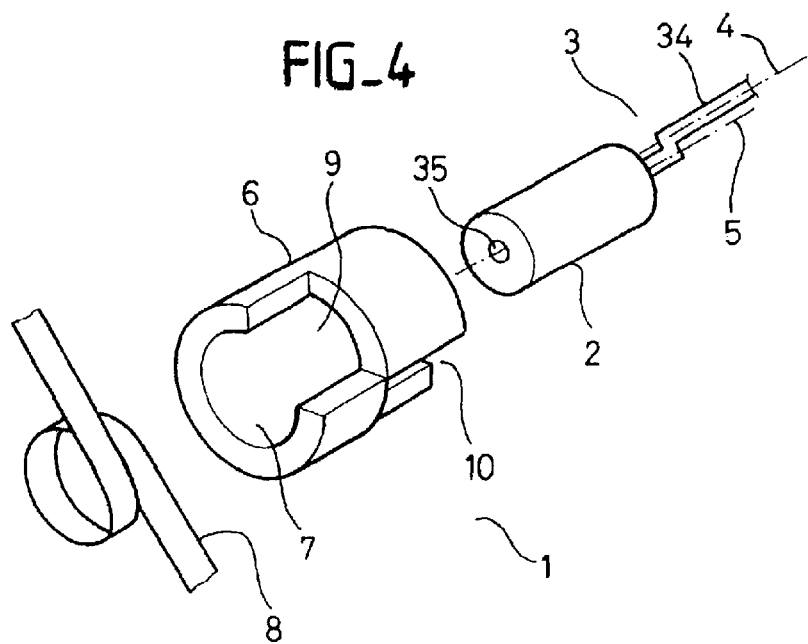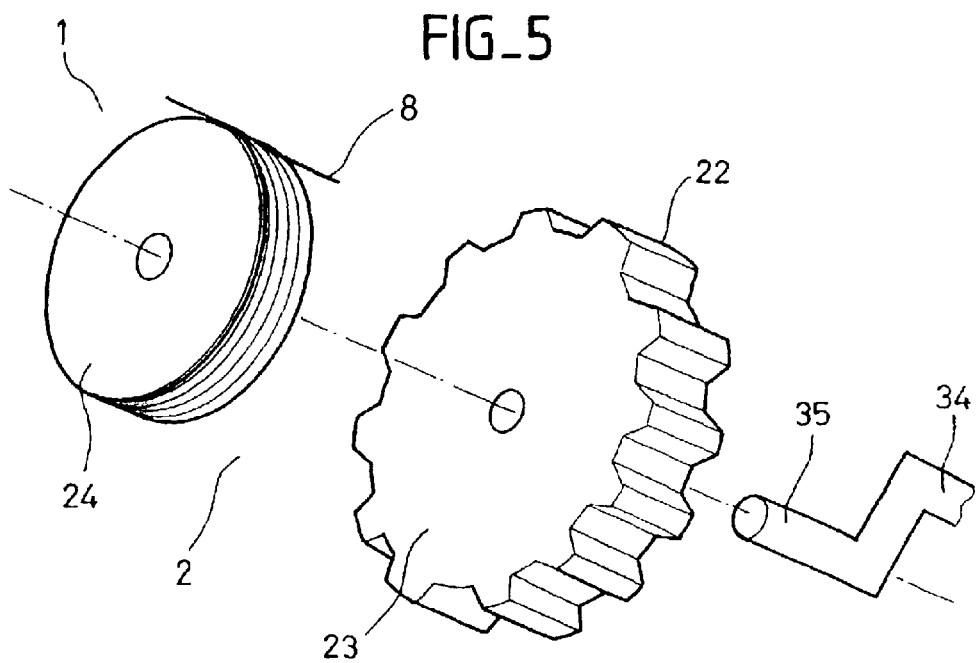

FIG_6
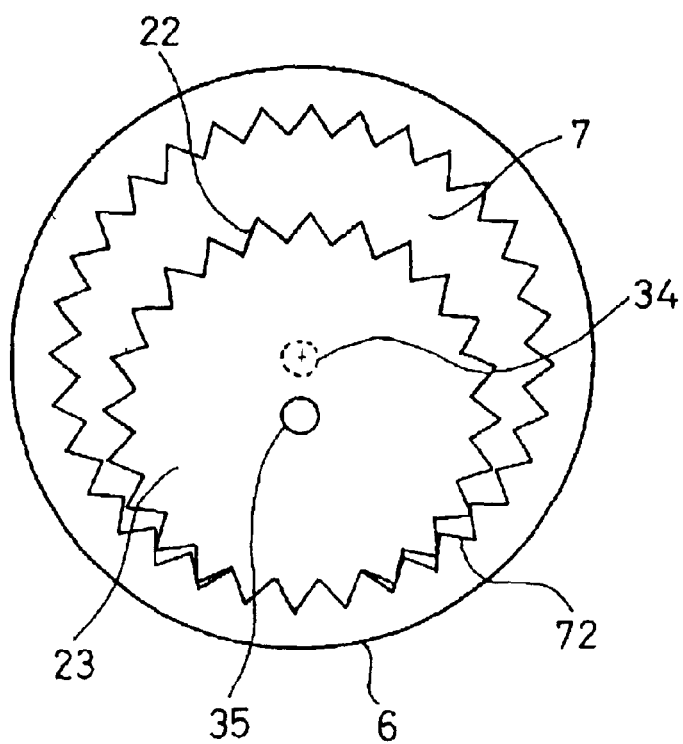
FIG_7
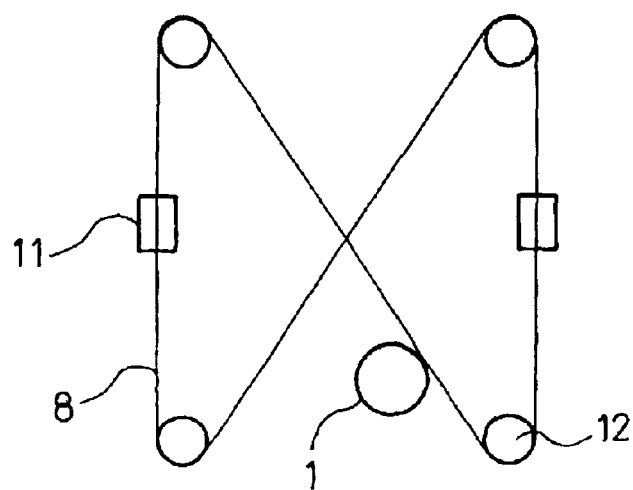

FIG_8
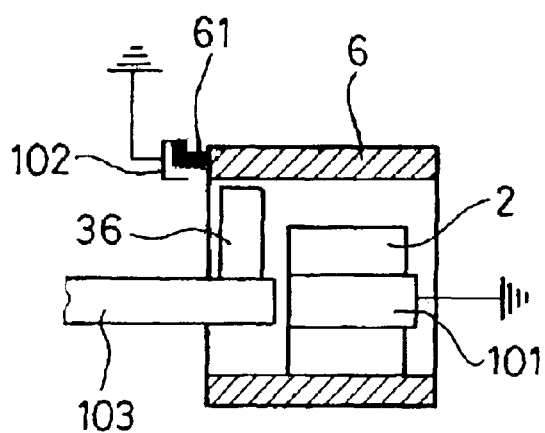
FIG_9
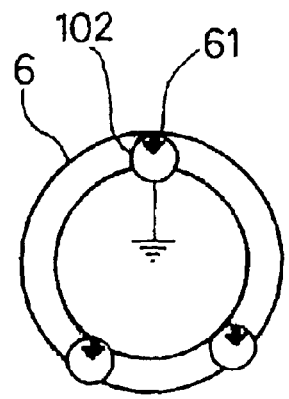

ECCENTRIC DRIVE REDUCTION GEAR FOR A TRANSMISSION COMPONENT WINDING DRUM

REFERENCE TO RELATED APPLICATIONS

The present invention claims priority to French Patent Application No. 02 06 844, filed Jun. 4, 2002.

TECHNICAL FIELD

The invention relates to mechanical reduction gears, and in particular to reduction gears for winding drums that move mechanical transmission components.

BACKGROUND OF THE INVENTION

Reduction gears are often used in window winders that raise and lower a window in an automobile. These reduction gears adjust the rotational speed of a motor to adjust the drive speed of the window.

Document FR-A-2 771 469 describes a gear motor fitted with a motor, a helical reduction gear and a worm coupled to the motor, and a cable driving drum coupled to the reduction gear wheel. This type of gear motor is costly and requires complex gearing. Moreover, the transmission efficiency of the reduction gear is low.

Document FR 2 815 994 describes a gear motor fitted with a motor, a planetary reduction gear and a cable driving drum coupled to the reduction gear wheel. The reduction gear used is costly, noisy and made up of many parts.

There is therefore a need for a reduction gear and a reduction gear window winder that overcomes one or more of these disadvantages.

SUMMARY OF THE INVENTION

The present invention is directed to an eccentric reduction gear comprising a ring gear, a planet pinion that is eccentric relative to the ring gear and a drive component driving the planet pinion and the ring gear such that they roll relative to each other. The invention also includes a winding drum for winding a transmission component (e.g., chain, belt, cable, etc.), wherein the winding drum is attached to the planet pinion.

In one embodiment of the invention, the ring gear is fixed. Another embodiment may include a transmission component, such as a belt, wound around the drum. In other embodiments, the belt may be gripped between the ring gear and the planet pinion or between the planet pinion and an inner surface of the ring gear.

Other embodiments may incorporate a ring gear and a planet pinion that roll without slippage relative to each other, meshing teeth on the ring gear and the planet pinion, and/or a planet pinion that rolls on an inner surface of the ring gear. According to another embodiment, the drum and the planet pinion comprise a single piece.

The invention is also directed to a window winder comprising the inventive reduction gear and a window driven by the reduction gear transmission component. In one embodiment, the window winder also has a housing in which the ring gear is arranged and in which the drum is lodged.

According to another embodiment, the window winder has belt counter gears that tension an elastic belt passing through the counter gears to form a circuit. This embodiment eliminates the need for a separate belt tensioner in the window winder.

BRIEF DESCRIPTION OF THE DRAWINGS

Characteristics and advantages of the invention are set out in the following description of the embodiments of the invention, given as an example and with reference to the appended drawings:

FIG. 1 is a schematic representation of main components in a drive reduction gear driving a mechanical transmission component according to one embodiment of the invention;

FIG. 2 is a cross-sectional view of the drive reduction gear;

FIG. 3 is another cross-sectional view of the drive reduction gear;

FIG. 4 is an exploded perspective view of the drive reduction gear shown in FIG. 2;

FIG. 5 is an exploded perspective view of a drive reduction gear according to another embodiment of the invention;

FIG. 6 is a schematic cross-sectional representation of the drive reduction gear in FIG. 5;

FIG. 7 is a schematic representation of a window winder having the inventive drive reduction gear;

FIG. 8 is a schematic representation of a reduction gear according to a third embodiment; and FIG. 9 is another view of the schematic representation shown in FIG. 8.

DETAILED DESCRIPTION OF THE EMBODIMENTS

Generally, the invention is directed to a reduction gear for driving a winding drum that winds a flexible, linear mechanical transmission component. The invention proposes moving a drum that drives the transmission component so that the transmission component rolls relative to a ring gear on an eccentric reduction gear.

In the following description, "flexible, linear mechanical transmission component" encompasses any transmission component capable of transmitting traction force between two points and capable of flexing to pass through counter gears. Examples of possible transmission components include chains, belts, cords, and cables.

FIG. 1 is a schematic diagram illustrating main components of an example of a reduction gear 1 disposed in a middle portion of a flexible mechanical transmission component 8. In this example, the reduction gear 1 includes a fixed ring gear 6 and a movable drum 2. The transmission component 8 is wound around the drum 2 and is rotatably driven by relative movement between the drum 2 and the ring gear 6. The transmission component 8 may be driven by any suitable known means. The drum 2 in the example is mounted rotatably on a support shaft 35. The axis of rotation 5 of the drum 2 around the support shaft 35 is preferably an axis of symmetry of the drum. This support shaft 35 is firmly attached to a drive shaft 34. The support shaft 35 and the drive shaft 34 thus form a pinion carrier 3 in a planetary or eccentric gear. The support shaft 35 is eccentric relative to the drive shaft 34. The drive shaft 34 is rotatably mounted relative to a fixed ring gear 6. Thus, the drum 2 is rotatably driven along the axis 4, which is eccentric relative to its axis of rotation 5, through the rotation of the drive shaft 34. The axes of rotation 4 and 5 are preferably parallel to facilitate the production of the reduction gear 1. The drum 2 in the illustrated example thus forms a planet pinion in a planetary gear train or eccentric gear train. When the drum 2 is rotatably driven by the drive shaft, the rolling surface 21 of the drum 2 rolls on a rolling surface 71 of the fixed ring gear 6.

The rolling surfaces 21, 71 of the drum 2 and the fixed ring gear 6, respectively, are shaped to ensure that they roll relative to each other. Assuming that the rolling surfaces 21 and 71 roll against each other, that the rolling surface 21 on the drum 2 is a cylinder with diameter d, and the rolling surface 71 on the fixed ring gear 6 is the inner surface of a cylinder with diameter D, the geometric condition with respect to the distance between center lines of the axes E to ensure that the surfaces 21 and 71 roll against each other can be expressed as $E=(D-d)/2$.

Rolling at the point of contact between the drum 2 and the fixed ring gear 6 is facilitated by using smooth rolling surfaces with a sufficient coefficient of friction that allows rolling. In the alternative, the rolling surfaces are equipped with teeth to facilitate rolling. Different alternatives for rolling surfaces will be given in detail below. Those skilled in the art will be able to determine which known materials have suitable coefficients of friction or braking strength for the invention based on the drive force of the transmission component.

FIGS. 2 through 4 illustrate one embodiment of the invention. In this embodiment, the rolling surface 21 and the drive section for the flexible transmission component 8 are combined on the drum 2. The fixed ring gear 6 has an orifice 7 defined by its rolling surface 71. The rolling surface 21 on the drum 2 is lodged in the orifice 7. The transmission component 8 is gripped between the rolling surface 21 on the drum 2 and the rolling surface 71 on the fixed ring gear 6. The flexible transmission component is thus interposed between the rolling surface 21 of the drum 2 and the rolling surface 71 of the fixed ring gear 6. The transmission component 8 ensures that the surfaces 21 and 71 roll relative to each other. The diameter of the rolling surface 21 of the drum 2 is then considered to be increased by the thickness of the transmission component 8.

In this embodiment, the rolling surface 71 of the fixed ring gear 6 may comprise several sectors of a cylinder. By rotatably driving the drive shaft 34 around the axis of rotation of a base cylinder of the rolling surface 71, the rolling surface 21 of the drum 2 rolls relative to the transmission component 8, preferably without slippage, and turns about the axis of the support shaft 35. Rolling without slippage is given to mean without slippage in a plane perpendicular to either of the axes 4, 5 of the drive shaft 34 or drum 2. However, there will preferably be slippage along the axis 5 of the drum 2 between the transmission component 8 and the rolling surface 21 of the drum 2. This prevents the whole transmission component 8 from moving along the axis 5 of the drum 2.

The position of the transmission component 8 therefore has the advantage of preventing any slipping of the rolling surface 21 of the drum 2, which acts as a planet pinion, against the fixed ring gear 6 even through there are no teeth in either the drum 2 or the ring gear 6. Moreover, the gripping prevents the transmission component 8 from slipping on the rolling surface 21 of the drum 2, even with a low number of windings. Although the figures show a transmission component 8 that is wound only once around the drum 2, several windings can also be envisaged to further reduce relative slippage between the transmission component 8 and the rolling surface 71 of the fixed ring gear 6. The fixed ring gear 6 may include a groove (not shown) to increase the transmission force between the rolling surface 71 and the transmission component 8. Any slip between the rolling surface 71 and the transmission component 8 can thus be reduced. The surface 21 of the drum 2 also rolls relative to the surface 71 of the ring gear 6. If an inner surface 71 of the fixed ring gear 6 and an outer surface 21 of the drum 2 are used, the following linear movement of the transmission component 8 for one revolution of the drive shaft 34 can be expressed as $Dist=\pi*(D7-D2)$, where D7 is the diameter of the rolling surface 71 of the fixed ring gear 6, D2 is the diameter of the rolling surface 21 of the drum 2 and Dist is the linear movement of the transmission component 8 for one revolution of the drive shaft 34. This calculation of the distance Dist is however approximate if the transmission component is a gripped belt, due to the gripping of the belt.

As shown in FIG. 4, the fixed ring gear 6 has two cut-outs 9 and 10 that are offset relative to each other along the axis of rotation of the base cylinder forming the ring gear 6. One end of the transmission component 8 passes through the first cut-out 9, while the other end of the winding of the transmission component passes through the second cut-out 10. Thus, even if the transmission component 8 is used to make the rolling surfaces 21 and 71 roll relative to each other, the transmission component 8 can stretch without incident from the drum 2 to other components of the drive chain.

A belt-shapes transmission component 8 is particularly suitable for this embodiment. A belt 8 can grip a surface over a large surface area to ensure its drive. A belt can also be easily compressed between two rolling surfaces, particularly if it is made from synthetic materials. Of course, other types of linear mechanical transmission component can be used in this embodiment without departing from the scope of the invention.

According to a second embodiment of the invention, as shown in FIGS. 5 and 6, a rolling surface 22 of the drum 2 and the drive section of the transmission component 8 are separated on the drum 2. This alternative presents fewer constraints in the choice of transmission component 8; cables and cords can be used as well as belts as the transmission component 8. The rolling surface 22 of the drum 2 comes into contact with a rolling surface 72 on the fixed ring gear 6. More particularly, the reduction gear 1 has a drum 2 with a rolling section 23 on the one hand and a winding section 24 for the transmission component 8 on the other hand. The rolling section 23 and the winding section 24 are firmly attached to each other. The rolling and winding sections 23 and 24 may be integrated together to form a single piece, for example by molding. The two sections 23 and 24 are mounted to rotate around the axis of the support shaft 35 in a similar way as the previous embodiment.

The outer surface 22 of the rolling section 23 is designed to roll on the inner surface 72 of the fixed ring gear 6. The outer surface 22 of the drum and the inner surface 72 of the fixed ring gear 6 are preferably cylindrical. The outer surface 22 of the rolling section 23 has a smaller diameter than the surface 72 of the fixed ring gear 6. The surfaces 22 and 72 are preferably provided with teeth to guarantee reciprocal rolling without slip. The teeth on the surfaces 22 and 72 preferably have the same diametric pitch so that engage with each other securely. The number of respective teeth on the surfaces 22 and 72 will therefore be different due to the different diameters of the outer surface 22 and the inner surface 72. If an inner surface 72 and an outer surface 22 are used, the following linear movement of the transmission component 8 for one revolution of the drive shaft 34 can be described as Dist=$\pi$*(D7–D2), where D7 is the diameter of the surface 72 and D2 is the diameter of the surface 22.

The winding section 24 uses any known suitable drive means to rotatably drive the transmission component 8. A cable drive groove may be provided in the winding section 24 in which a drive cable may be wound several times. Moreover, a known cam drive known may also be used instead of the illustrated pinion carrier 3, which is fitted with a support shaft 35 and a drive shaft 34 eccentric relative to each other.

FIG. 8 shows a third embodiment of a reduction gear 1. The fixed ring gear 6 in this embodiment has studs 61 lodged movably in fixed collars 102 to allow the fixed ring gear 6 to move radially. The collars 102 permit limited radial movement of the fixed ring gear 6. The fixed ring gear 6 is driven radially through a cam 36 that is firmly attached to a rotating drive shaft 103. A drum 2 is lodged in the fixed ring gear 6 and is capable of rolling on an inner surface of the fixed ring gear 6. The drum 2 therefore forms a planet pinion in a planetary gear train or eccentric gear train. The driving of the drum 2 by the fixed ring gear 6 can be achieved by any suitable means such as, for example, friction or gearing. The drum 2 is mounted rotatably relative to a fixed support shaft 101. The shafts 101 and 103 are coaxial. The drum 2 is designed appropriately to drive a transmission component as described above. This embodiment allows the transmission component to be driven without radial movement at the drum 2, reducing vibrations and wear on the transmission component.

FIG. 7 is a schematic illustration of an example of an application using the reduction gear 1 described above as a window winder. In this example, the reduction gear 1 drives a flexible, linear mechanical transmission component 8 in a translating motion in a circuit formed with counter gears 12. Travellers 11 are fitted to a window (not shown) and are attached to the transmission component 8 to drive the window along a defined course between the counter gears 12. The drive shaft 34 can be driven in any known manner, such as by a crank or a window winder motor. The inventive reduction gear is particularly suitable for fitting in a window winder because it is compact and ensures that the drive cannot be reversed. Thus, an intruder will not be able to open the door window by exerting force on the window.

The fixed ring gear can also be arranged in a drum housing. Provision can then be made for the drive shaft 34 to be guided in rotation on the drum housing.

An elastic belt-shaped transmission component 8 is also preferably provided. The use of a belt generally facilitates the assembly of the window winder by eliminating cable coiling and uncoiling stages during manufacturing. A belt made mainly of rubber or other material with sufficient elasticity to remain taut between the different counter gears should be used. The elasticity of the belt compensates for the assembly clearances and production tolerances of the various parts of the window winder. This means that specific belt tensioners (e.g., a window winder component that provides adjustable belt tension) do not have to be used. The absence of tensioners simplifies the assembly of the window winder, increases its corrosion resistance and reduces its sensitivity to dust.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A drive reduction gear, comprising:
   a ring gear having a first cutout and a second cutout;
   a planet pinion that is eccentric relative to the ring gear and having a winding portion;
   a transmission component wound around the winding portion and disposed between the ring gear and the planet pinion, wherein one end of the transmission component passes through the first cutout and another end of the transmission component passes through the second cutout; and
   a drive component that drives at least one of the planet pinion and the ring gear such that the planet pinion and the ring gear roll relative to each other.

2. The reduction gear of claim 1, wherein the ring gear is fixed.

3. The reduction gear of claim 1, wherein the transmission component is one selected from the group consisting of a belt, a cable, a chain, and a cord.

4. The reduction gear of claim 1, wherein the transmission component is gripped between the planet pinion and an inner surface of the ring gear.

5. The reduction gear of claim 1, wherein the ring gear and the planet pinion roil relative to each other without slippage.

6. The reduction gear of claim 5, wherein the ring gear and the planet pinion each have a plurality of teeth, wherein the plurality of teeth of the ring gear mesh with the plurality of teeth of the planet pinion, and wherein the reduction gear further comprises a winding drum attached to the planet pinion to act as the winding portion.

7. The reduction gear according to claim 6, wherein the planet pinion rolls on an inner surface of the ring gear.

8. The reduction gear of claim 6, wherein the winding drum and the planet pinion are integrated together as a single piece.

9. The reduction gear of claim 1, further comprising a plurality of studs, wherein each of the plurality of studs is disposed in a collar fixed on the ring gear.

10. The reduction gear of claim 1, wherein the first cutout and the second cutout are offset relative to each other along an axis of rotation of the ring gear.

11. The reduction gear of claim 1, wherein the first cutout and the second cutout are offset relative to each other angularly relative to a surface of the ring gear.

12. A window winder system for a vehicle, comprising:
a reduction gear having
a ring gear,
a planet pinion that is eccentric relative to the ring gear and having a winding portion,
a drive component that drives at least one of the planet pinion and the ring gear such that the planet pinion and the ring gear roll relative to each other, and
a transmission component wound around the winding portion;
at least one counter gear, wherein the transmission component passes through said at least one counter gear to form a circuit; and
at least one traveller that supports a vehicle window, wherein said at least one traveller is attached to the transmission component.

13. The window winder system of claim 12, wherein the transmission component is one selected from the group consisting of a belt, a cable, a chain, and a cord.

14. The window winder system of claim 12, wherein the transmission component is a tensioned elastic belt.

15. The window winder system of claim 12, wherein the transmission component is a bolt gripped between the planet pinion and an inner surface of the ring gear.

16. The window winder system of claim 12, wherein the ring gear and the planet pinion roll relative to each other without slippage.

17. The window winder system of claim 16, wherein the ring gear and the planet pinion each have a plurality of teeth, wherein the plurality of teeth of the ring gear mesh with the plurality of teeth of the planet pinion, and wherein the reduction gear further comprises a winding drum attached to the planet pinion to act as the winding portion.

18. The window winder system according to claim 17, wherein the planet pinion rolls on an inner surface of the ring gear.

19. The window winder system of claim 12, wherein the winding drum and the planet pinion are integrated together as a single piece.

20. The window winder system of claim 12, further comprising a housing that houses the ring gear and the planet pinion.

21. The window winder system of claim 12, further comprising a vehicle window attached to said at least one traveller such that the vehicle window is driven by said at least one traveller.

22. The window winder system of claim 12, wherein the reduction gear further comprises a plurality of studs, wherein each of the plurality of studs is disposed in a collar fixed on the ring gear.

* * * * *

UNITED STATES PATENT AND TRADEMARK OFFICE
CERTIFICATE OF CORRECTION

PATENT NO. : 6,949,043 B2
DATED : September 27, 2005
INVENTOR(S) : Rhodes et al.

It is certified that error appears in the above-identified patent and that said Letters Patent is hereby corrected as shown below:

Column 7,
Line 24, "bolt" should read as -- belt --.

Signed and Sealed this

Twenty-ninth Day of November, 2005

JON W. DUDAS
*Director of the United States Patent and Trademark Office*